(12) United States Patent
Blum et al.

(10) Patent No.: US 10,476,244 B2
(45) Date of Patent: Nov. 12, 2019

(54) CABLE PROCESSING DEVICE

(71) Applicant: KOMAX HOLDING AG, Dierikon (CH)

(72) Inventors: Flavio Blum, Hergiswil (CH); Beat Wicki, Adligenswil (CH)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 16/070,556

(22) PCT Filed: Jan. 26, 2017

(86) PCT No.: PCT/EP2017/051611
§ 371 (c)(1),
(2) Date: Jul. 17, 2018

(87) PCT Pub. No.: WO2017/129658
PCT Pub. Date: Aug. 3, 2017

(65) Prior Publication Data
US 2019/0027906 A1 Jan. 24, 2019

(30) Foreign Application Priority Data
Jan. 26, 2016 (EP) .................................. 16152828

(51) Int. Cl.
*H02G 1/12* (2006.01)
*B65H 51/30* (2006.01)
(Continued)

(52) U.S. Cl.
CPC ........... *H02G 1/1248* (2013.01); *B65H 51/30* (2013.01); *B65H 57/16* (2013.01); *H01R 43/052* (2013.01)

(58) Field of Classification Search
CPC .... H01R 43/28; H01R 43/052; H02G 1/1248; H02G 1/1256; Y10T 29/5187;
(Continued)

(56) References Cited

U.S. PATENT DOCUMENTS 4,638,904 A    1/1987 Randar et al.

FOREIGN PATENT DOCUMENTS

| DE | 3617634 A1 | 8/1987 |
|---|---|---|
| DE | 4105631 A1 | 8/1991 |

(Continued)

*Primary Examiner* — Gene O Crawford
*Assistant Examiner* — Lester Ill Rushin
(74) *Attorney, Agent, or Firm* — William J. Clemens; Shumaker, Loop & Kendrick, LLP

(57) ABSTRACT

A cable processing device includes a cable conveying device running along a machine longitudinal axis transporting a cable, and a cable changer selectively supplying cables for processing. The cable changer has two guide units for guiding and holding one cable each and being movable between inoperative and active positions. In the inoperative position, the guide unit is positioned outside the cable conveying device spaced from the machine axis. In the active position, the guide unit is positioned coaxially with the machine axis producing an operative connection to the cable conveying device. The guide units are movable independently of each other. When one of the guide units is moved from the inoperative position into the active position, the other guide unit remains positionally fixed in the inoperative position. When the guide units are both in their inoperative positions, they are positioned lying next to each other on a common horizontal plane.

23 Claims, 8 Drawing Sheets

(51) Int. Cl.
*B65H 57/16* (2006.01)
*H01R 43/052* (2006.01)

(58) Field of Classification Search
CPC ........ Y10T 29/53187; B65H 2701/341; B65H 51/30; B65H 57/16
USPC ....... 29/745, 771; 198/226.91, 470.01, 803.7
See application file for complete search history.

(56) References Cited

FOREIGN PATENT DOCUMENTS

| | | |
|---|---|---|
| DE | 102009031076 B3 | 8/2010 |
| EP | 0598276 A1 | 5/1994 |
| EP | 1028501 A1 | 8/2000 |
| EP | 1213800 B1 | 6/2002 |
| EP | 1447888 A1 | 8/2004 |
| EP | 1879199 A2 | 1/2008 |

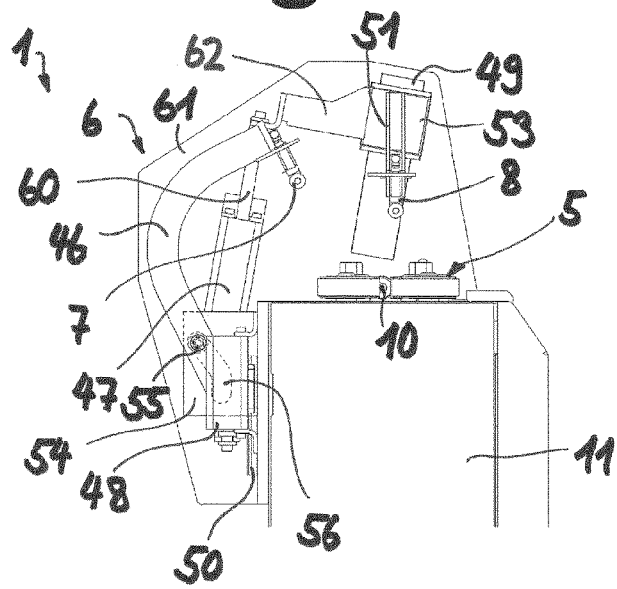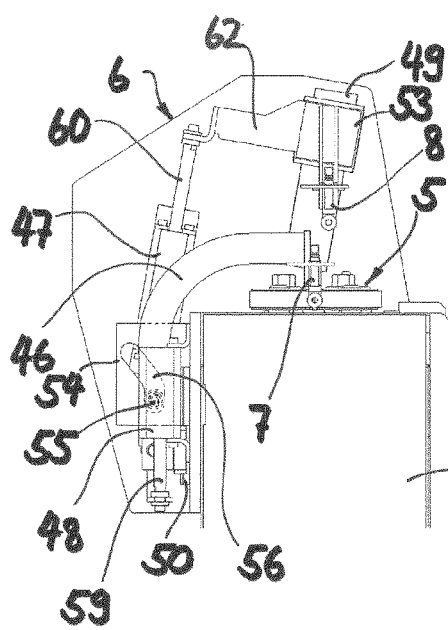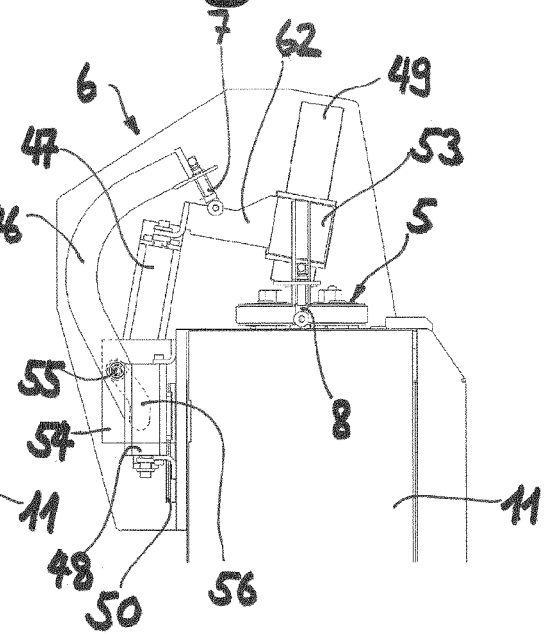

CABLE PROCESSING DEVICE

FIELD

The invention relates to a cable processing device including at least one processing station for processing cable ends of cables, a cable conveying device running along a machine longitudinal axis for transporting a cable to the at least one processing station in the direction of the machine longitudinal axis, and a cable changer, arranged in a region of the cable conveying device, for the selective supply of cables to the at least one processing station. Cable processing devices of this kind are used to prepare cables. When cables are prepared, cables are trimmed and stripped; after this, the cable ends can be crimped and optionally provided with grommets and/or plug housings.

BACKGROUND

The cables, such as insulated strands or solid conductors made of copper or steel, that are worked on the cable processing device are usually provided in drums, on reels or as bundles and are conveyed by means of a cable conveying device to the processing station. A cable processing device is disclosed in EP 1 447 888 A1, for example. EP 1 447 888 A1 discloses a cable processing device comprising a stripping unit and two crimping stations as processing stations. The cable is guided to the processing stations by means of a cable conveying device formed as a belt drive, said cable conveying device being configured as a cable feed for moving the cable along a machine longitudinal axis of the cable processing device.

When the cable supply, for example a cable reel, runs out, a new cable must be removed from a new cable reel and supplied to the processing stations. For cable preparation, it may also be necessary to work other cables, for example cables of another color. For this purpose, it is known to use a cable processing device comprising a cable changer. Cable changers for the selective supply of cables to the processing stations typically comprise two guide units for guiding and holding one cable each. Owing to the second guide unit, in which a second cable is guided and held, a more rapid cable change is possible. The second or additional guide unit makes it possible to prepare a second cable during operation or while the cable processing device is operating. This can prevent an interruption in production, for example due to an emptying cable drum, in that a new drum is provided and the corresponding cable is already accommodated in the second guide unit. The changeover time can be shortened and two different cables can be worked alternately as necessary. A cable changer of this kind has been disclosed in EP 1 879 199 A2, for example. In the case of this cable changer, the guide units are cylindrical. For the cable change, one rotational movement must be carried out, which leads to a complicated mechanical construction. The drum must be lowered together with the two guide units including a rotary bearing for the drum, in order to bring the cable into the operating region of the cable conveying device. A further disadvantage is that the cables may cross and touch each other.

A cable processing device comprising guide units that are also cylindrical has been disclosed in DE 41 05 631 A1. In order to change a cable to another, a selective rotational movement must be carried out, in which all of the guide units are rotated with each other.

A further cable processing device comprising a cable changer of the type mentioned at the outset is disclosed in EP 1 213 800 B1. This cable changer may accommodate a large number of cables that are optionally supplied, by means of the cable conveying device, to the processing stations in order for the cable ends to be processed. The cable changer comprises a plurality of guide units that are arranged linearly one above the other. The guide units are arranged in a vertical frame in this case. The frame can be moved up and down in the vertical direction. The cables arranged on top of each other in the cable changer may have different cross sections, colors, insulations and/or conductor properties. Depending on the cable to be worked, the frame is moved up or down until the relevant cable guide comprising the desired cable is in the correct position on the machine longitudinal axis in the cable conveying device. The cable processing device comprising this cable changer is characterized by high variability and the cable changer can be used in sequence processing and in particular for housing assembly; however, the machine is expensive and complex and leads to relatively high initial costs. In this system, it is also impossible or at least nearly impossible to introduce new cables into the cable changer during operation.

SUMMARY

It is therefore an object of the present invention to avoid the disadvantages of the known arrangements and in particular to produce a cable processing device that makes it possible to change cables efficiently.

This object is achieved according to the invention by a cable processing device used to prepare cables and comprising one or more processing stations for processing cable ends of the cables. Processing stations may be stripping stations, grommet stations or crimping stations, for example. The cable processing device further comprises a cable conveying device running along a machine longitudinal axis of the cable processing device for transporting a cable in the direction of the machine longitudinal axis to at least one processing station. The cable conveying device is preferably formed as a cable feed in this case. The cable transport device preferably formed as a cable feed may be designed as a roller drive or belt drive. The roller drive or belt drive can be brought into an open position simply by moving the rollers or belts opposite each other apart, so that the guide unit together with the cable desired for further working can be easily introduced into the cable conveying device.

For the selective and mechanical supply of cables to at least one processing station for processing the cable ends, a cable changer arranged in the region of the cable conveying device is provided. The cable changer comprises at least two guide units for guiding and holding one cable each, the guide units being movable between an inoperative position, in order to pause or to receive new cables, and an active position, in order to produce an operative connection to the cable conveying device.

The guide units of the cable changer can be moved by means of an actuator or a plurality of actuators, optionally even manually, between the inoperative position and the active position. For this purpose, pneumatic means may be used, for example. However, hydraulic means, linear drives or motor drives may also be actuators. When the guide unit is in the inoperative position, the guide unit is positioned outside the cable conveying device such that the cable held in the guide unit temporarily cannot be processed. In the inoperative position, the cable supported by the corresponding guide unit is spaced apart from the machine longitudinal axis, and the guide unit is arranged in the cable changer in the inoperative position such that the guide unit runs or is oriented in parallel with the machine longitudinal axis. When the guide unit is in the active position, the guide unit is positioned inside the cable conveying device such that the cable can be grasped and transported by the cable conveying device. The cable associated with the guide unit can therefore directly participate in the working process in the active position. Particularly preferably, in the active position, the guide unit is positioned and oriented axially to the machine longitudinal axis; the cable of the guide unit therefore lies on or in the machine longitudinal axis in the active position, which ensures efficient transport of the cable by means of the cable conveying device in order to be processed.

The guide units may comprise guide means, such as a guide tube, in order to guide the cable through the conveying device. Preferably, in this case, the guide unit comprises at least one guide tube on the input side, which guide tube is arranged upstream of the cable conveying device in the machine longitudinal axis with regard to the direction of transport. The guide units may further comprise braking means that positionally retain the cables that are not transported in the inoperative position with regard to the cable axis.

According to the invention, the at least two guide units are configured, or fitted or integrated in the cable changer, in such a manner that the guide units are movable from the inoperative position into the active position (or vice versa: from the active position into the inoperative position) independently of each other. "Movable independently of each other" means that when one of the guide units is moved, the other guide unit is not affected by this movement. The other guide units preferably remain in the respective inoperative positions. The other guide units mentioned could also mean only one guide unit. This is because if a cable processing device designed for two cables comprises two guide units, only the other guide unit would remain in the inoperative position, of course.

The independent movability can be achieved, for example, in that the guide units are not mechanically interconnected or coupled to each other. Because the selected guide unit for producing the desired position (inoperative position or active position) can be moved without influencing the other guide units, a plurality of advantages can be achieved. Due to the independent movability of the guide units, the mode of operation of the cable changer can be considerably improved with regard to effectiveness. The guide units can be easily accessed by the operator in the inoperative position, even during production operation, in order to introduce new cables. The cable changer is further characterized by a simple mechanical construction. A compact and cost-effective module is therefore produced. Furthermore, the cable change can be automated by means of simple technical means. The cable changer may be installed in various types and variants of cable processing machines. It is also conceivable to retrofit conventional cable processing machines with the cable changer described here. A further advantage is that the cables of the guide units can be cleanly separated from each other.

For a preferred embodiment, the cable changer may be designed in such a manner that, when one of the guide units of the at least two guide units is moved from the operative position into the active position, for example by means of an actuator, the other guide unit or other guide units remain(s) positionally fixed in the inoperative position.

When, for example, a cable processing device designed for two cables comprises two cables, the cable changer can essentially assume three positions, these being the following three positions: an initial position and two operating positions. In the initial position, the two guide units are in their respective inoperative positions. A first operating position exists when a first guide unit is in the active position, while the second guide unit remains in the inoperative position; a second operating position exists when the other or second guide unit is in the active position, while the first guide unit is in the inoperative position.

Particularly preferably, the at least two guide units of the cable changer may, when these at least two guide units are in their respective inoperative positions, be positioned lying next to each other and preferably on a common horizontal plane. The guide units may be arranged above or below the cable conveying device in the inoperative positions.

The at least two guide units may each be connected or fastened to push elements, the push elements being translationally movable in order to move the respective guide units. The translational movement can take place transversely to the machine longitudinal axis in this case. Preferably, the push elements are translationally movable within a plane that runs perpendicularly to the machine longitudinal axis.

It may be advantageous if the cable change preferably comprises vertical push guides, for example in the form of guide rods, for lowering and raising the respective guide units preferably vertically, the push elements each being displaceably mounted on the push guides. Owing to the push elements displaceably mounted in push guides, the guide units can easily be moved in order to produce the active position or the inoperative position.

In a further embodiment of the cable processing device, the relevant guide unit may be pivotably mounted on the relevant push element by means of a lever assembly comprising at least one lever part. The associated pivot axis preferably runs axially parallel to the machine longitudinal axis in this case. As a result, the guide unit can carry out a lateral movement transversely to the translational lowering or raising direction specified by the push elements. Instead of lever assemblies comprising pivotable lever parts, the sideways or transverse movement of the guide unit could also be made possible by using other means. For example, the guide unit could be arranged on a resilient part that can be bent by appropriate action in order to produce the active position.

The lever part may comprise a swivel pin by means of which the lever part is pivotably connected to the push element. The guide unit may be arranged on the opposite side of the lever part or in the region of the front free end of the lever part.

The above-mentioned lateral movement of the guide unit mounted preferably pivotably on the push element can be achieved by various measures. For example, a horizontally acting actuator may be used that can actively move the guide unit to the side. However, it is advantageous if the lateral movement takes place passively. For this purpose, the cable processing device may comprise a guideway for specifying a predefined movement of the guide unit from the inoperative position into the active position. A guideway of this type is used preferably together with the lever assembly, by means of which the relevant guide unit is pivotably mounted on the push element.

It may also be advantageous if the cable processing device comprises a guideway that is arranged opposite the guide units. The guide unit that is to be moved laterally in order to produce the active position interacts with the guideway if the push element is lowered in such a manner that the guide unit can be moved along the guideway in a sliding or rolling manner, for example. The guide unit may comprise an engagement member for moving along the guideway in a sliding or rolling manner.

The guideway may comprise at least one run-on flank, along which one of the guide units in each case can be moved. If the cable changer comprises two guide units, for example, the guideway preferably comprises two run-on flanks. The guideway may therefore comprise two guide portions, one of the two run-on flanks forming one guide portion in each case. The guide portions of the guideway may be formed by a component. However, it is also conceivable to provide two separate components in order to produce the guide portions and/or the run-on flanks.

When the cable changer comprises two guide units, for example, the guideway can be in operative connection to the two guide units. However, it is also possible that only one guide unit for producing the active position must be pushed away to the side when moving along the guideway in a sliding or rolling manner or when moving down the guideway, whereas the second or other guide unit is arranged above the conveying device in such a manner that only one translational movement must be carried out. Therefore, in this case, only one run-on flank is necessary. However, other embodiments of the guideway are also conceivable. Instead of the described guideway comprising the at least one run-on flank, a slotted link having a guide channel could be provided in order to produce a cam control. A control body, for example in the form of a cam, associated with the guide unit can inevitably be guided in the guide channel of the slotted link.

A further advantage may be produced if a positioning trough for fixing the relevant guide unit in the active position is attached to the run-on flank. The active position can thus be reached and secured reliably.

Particularly preferably, the guideway comprises two run-on flanks that are each associated with a guide unit and run towards each other in a V shape. In this case, the positioning trough is arranged in the opening region of the run-on flanks.

The relevant guide unit may comprise one retaining device for securing the cable in the inoperative position. The retaining device may comprise braking means that hold the cable that has not been transported in place in the inoperative position with regard to the cable axis. The braking means can hold the cable in a clamping manner by means of a clamping member, for example, and thereby prevent the cable from slipping. In this case, the braking means can be configured, and in particular interact with the guideway or another stop, in such a manner that when the active position is produced, the braking means removes the impact on the cable and the cable is released with regard to the cable axis. The impact of the retaining device on the cable is preferably removed by the action of a stop on the guide unit, as a result of which the impact on the cable is automatically removed simply by the movement of the guide unit. Furthermore, clamping and returning elements of the type found in EP 1 213 800 B1 are provided.

The guide unit may comprise at least one spring element for reliably reaching the inoperative position. Particularly preferably, this spring element is preloaded into the inoperative position. In the active position, the spring element therefore generates a return force on the guide unit, as a result of which there is an advantageous return movement into the inoperative position. This spring element is therefore referred to as a return spring hereafter.

In order to fix the guide unit in place in the inoperative position, at least one stopping or positioning element may be provided in order to form a stop for the guide unit and in order to restrict the pivot movement when the guide unit returns from the active position into the inoperative position.

For simple handling, it may be advantageous if at least one separating element for separating and organizing the at least two cables, which then enter the cable changer, is arranged upstream of the cable changer. The separating element may be formed by a separating plate, for example. The separating plate may be oriented or arranged vertically when the guide units are arranged lying next to each other and preferably on a horizontal plane.

In a further embodiment, the guide units may be mounted so as to be displaceable relative to a machine support of the cable processing device, in order to move the respective guide units between the active position and the inoperative position by means of linear guides in each case. The linear guide may comprise a profile rail as a guide means in this case. This profile rail may be fastened to the machine support directly or by means of a supporting construction. The linear guide further comprises a carriage that is configured so as to complement the profile rail, on which carriage the relevant guide unit is arranged. The carriage and therefore the guide unit connected thereto can be displaced easily and precisely between the active position and the inoperative position. This carriage may be regarded as a push element as already mentioned.

At least one of the linear guides may be arranged in the cable processing device so as to be oblique relative to the vertical, such that the guide unit associated with the above-mentioned oblique linear guide can be translationally moved obliquely between the inoperative position and the active position. This obliquely movable guide unit may be rigidly connected to a carriage of the linear guide by means of a holding arm, for example. A pivot mechanism is not necessary. Owing to the oblique linear drive, the guide unit can be introduced easily and efficiently into the conveying device in order to produce the active position.

Furthermore, a slotted link may be provided for defined movement of at least one of the guide units along a control curve from the inoperative position into the active position. The slotted link may comprise a guide slot or a guide groove in which a control body can be moved along. The longitudinal extension of the guide slot or the guide groove specifies the control curve. The control body is associated with the relevant guide unit in this case. For example, the control body may be arranged on a lever part that is pivotably mounted on a push element or carriage of the linear guide in order to support the relevant guide unit. The control body may comprise a roller that is attached to the lever part so as to be freely rotatable. A simple control cam that is in engagement with the guide slot or the guide groove would of course also be conceivable as a control body.

The slotted link may be connected to or arranged with regard to the machine support in such a manner that the associated guide (guide slot or guide groove) runs transversely and preferably perpendicularly to the machine longitudinal axis. The guide may comprise straight and curved guide portions depending on the desired movement.

The lever part pivotably mounted on a push element or carriage of a linear drive may be curved.

It may be advantageous if the mechanism for moving the guide units is configured differently. It may be particularly advantageous if one of the guide units is configured so as to be translationally movable obliquely between the inoperative position and the active position and the other guide unit follows a curve predetermined by the slotted link between the inoperative position and the active position.

The cable processing device may comprise linearly acting actuators in order to move the guide units between the inoperative position and the active position, the actuators being selected from a group consisting of pneumatic cylinders, hydraulic cylinders, electromechanical linear drives, rack and pinion drives or spindle drives.

DESCRIPTION OF THE DRAWINGS

Further advantages and individual features can be found in the following description of an embodiment and in the drawings, in which:

FIG. 15 is a side view of the cable processing device according to FIG. 12, FIG. 16 is a side view of the cable processing device with the cable changer in the first operating position, FIG. 17 is a side view of the cable processing device with the cable changer in the second operating position.

DETAILED DESCRIPTION

Figure 1:
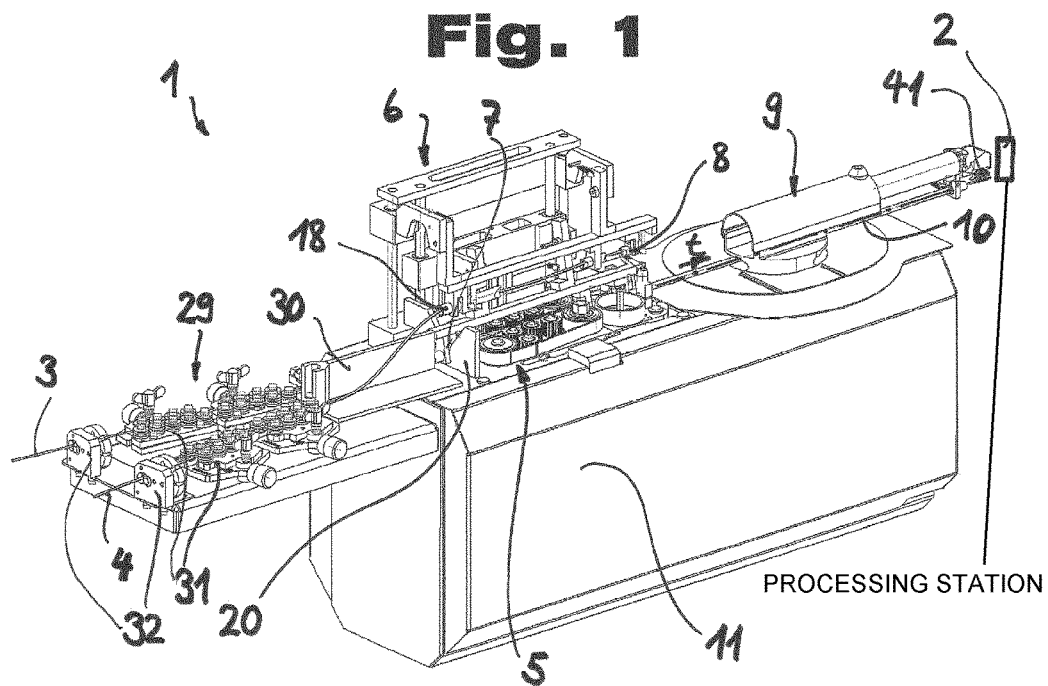
FIG. 1 is a perspective view of a cable processing device comprising a cable changer according to the invention.

FIG. 1 shows a cable processing device, denoted as a whole by 1, for processing cables 3, 4 and for preparing cable ends. In the present case, the cable processing device 1 is designed as a pivot machine by way of example and comprises a pivot unit 9 having a cable gripper 41, by means of which the leading cable ends of the cable 3 are brought to at least one processing station 2. In the present case, the processing station 2 is shown merely symbolically; the cable processing device 1 can therefore comprise a trimming and stripping station which is usually arranged on the machine longitudinal axis denoted by 10. A grommet station and a crimping station, for example, may be additional processing stations 2. The grommet station and the crimping station are usually arranged in the cable processing device 1 such that the pivot unit 9 must be rotated about a vertical axis.

For feeding the cable, the cable processing device 1 comprises a cable conveying device 5 for supplying the cable 3 to the pivot unit 9 and the processing station 2. In the present case, the cable conveying device 5 is configured as a conveyor belt and conveys the relevant cable along the machine longitudinal axis 10 to the pivot unit 9. The direction of transport of the cable along the machine longitudinal axis 10 is indicated by the arrow t.

A cable changer 6 for the selective supply of cables 3, 4 for processing the cable ends is arranged in the region of the cable conveying device 5. The present cable processing device 1 is designed for two cables 3, 4, of which one of the cables is then worked selectively by means of the cable changer 6. The cables 3, 4 are electric cables, for example insulated strands or insulated solid conductors made of copper or steel, which are provided in drums, on reels, as bundles or in another cable storage means (not shown). Depending on which of the two cables 3, 4 is specifically to be worked, the corresponding cable 3, 4 is brought into engagement with the cable conveying device 5 by means of the cable changer 6, whereupon the corresponding cable can be transported and processed. In the illustration according to FIG. 1, this is the cable denoted by 3. When the cable supply for the cable 3 runs out, the cable changer 6 makes it possible to rapidly switch to a new or different cable 4. The construction of the cable changer 6 and the exact function is explained in detail in the following with reference to FIGS. 2 to 11.

The additional guide unit also makes it possible to prepare a second cable when the cable processing device 1 is in operation. As a result, the changeover time is shortened and two different cables 3, 4 can be worked alternately. An interruption in production can also be prevented by an emptying cable drum or another emptying cable supply, in that a new cable drum is provided and the cable therefrom is provided by introducing the cable into the cable changer 6 in the cable processing device 1.

The cable conveying device 5 comprising the cable changer 6 and the pivot unit 9 are mounted on a machine support 11. As the cables 3, 4 fed from drums, reels or bundles to the cable processing device 1 are more or less significantly curved and are twisted, the cables must each be straightened, for which purpose a straightening station 29 is used. The straightening station 29 comprises two straightening devices 31 for the cables 3 and 4. A knot detection device 32 is arranged in front of each straightening device 31.

Figure 2:
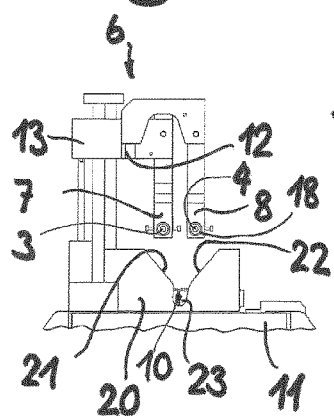
FIG. 2 is a detail view of the cable processing device from FIG. 1 in a front view with the cable changer in an initial position.
Figure 3:
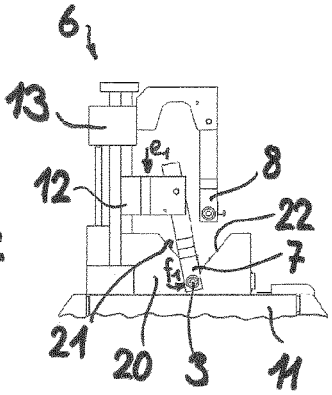
FIG. 3 shows the cable processing device with the cable changer in a first operating position.
Figure 4:
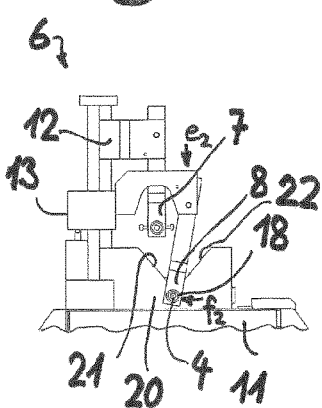
FIG. 4 shows the cable processing device with the cable changer in a second operating position.

FIGS. 2 to 4 show the three basic positions that the cable changer 6 can assume. The position of the cable changer 6 according to FIG. 2 corresponds to an initial position. FIGS. 3 and 4 show the two possible operating positions in which each of the cables 3 (FIG. 3), 4 (FIG. 4) can be processed. The cable changer 6 comprises two guide units 7, 8 for guiding and holding one cable 3, 4 each. The guide units 7, 8 are each pivotably mounted on push elements 12, 13, the push elements 12, 13 being movable in the vertical direction.

In the initial position according to FIG. 2, the two guide units 7 and 8 are each in an inoperative position. In the initial position or when the two guide units 7, 8 are in their inoperative position, the guide units are arranged next to each other, the guide units 7 and 8 and therefore also the cables 3 and 4 held therein clearly lie approximately on a common horizontal plane. By lowering one of the push elements 12, 13, the relevant guide unit 7, 8 comprising the desired cable 3, 4 can be transferred into the position trough 23, which lies in the region of the machine longitudinal axis. The position trough 23 runs in or along the machine longitudinal axis 10 and provides an active position.

In FIG. 3, the first guide unit 7 is in the active position, whereas the second guide unit 8 remains in the inoperative position; in FIG. 4, the second guide unit 8 is in the active position, whereas the first guide unit 7 remains in the inoperative position. In the active position, the relevant guide unit 7 or 8 is positioned coaxially with respect to the machine longitudinal axis 10 in order to produce an operative connection to the cable conveying device 5. In the inoperative position, the relevant guide unit 8 or 7 is positioned outside the cable conveying device 5 and spaced apart from the machine longitudinal axis 10. When the guide units 7, 8 of the cable changer 6 are in their respective inoperative positions, the guide units 7, 8 are positioned lying next to each other and preferably on a common horizontal plane. This arrangement ensures a clean separation and has the advantage of easy accessibility for the cable change even during production operation.

The guideway denoted by 20 is provided in order to produce the active position, which guideway is opposite the guide units 7 and 8 and can interact therewith. The guideway 20 comprises two guide portions, the guide portions clearly being formed by two run-on flanks 21 and 22 that run towards each other in a V shape and open into the above-mentioned position trough 23. In other words, the position trough 23 is arranged in the tip of the "V". If the push element 12, as shown in FIG. 3, is then lowered in the $e_1$ direction, the guide unit 7 is, in a first phase, initially moved vertically downwards in a purely translational manner. After contact with the run-on flank 21, in the case of further or continued lowering of the push element 12 in the $e_1$ direction, the guide unit 7 is additionally pivoted out. The corresponding pivot movement is indicated in FIG. 3 by an arrow $f_1$. The second guide unit 8 correspondingly interacts with the run-on flank 22. In FIG. 4, the movements for the second guide unit 8 are indicated by the arrows $e_2$ (lowering movement) and $f_2$ (pivot movement).

With reference to FIGS. 3 and 4, it is clear that the cable changer 6 is configured in such a manner that the guide units 7 and 8 are movable independently of each other. When one of the guide units 7, 8 is moved in order to produce the active position, the other guide unit 7, 8 is not affected by this movement. The other guide unit 7, 8 remains in its inoperative position.

Figure 5:
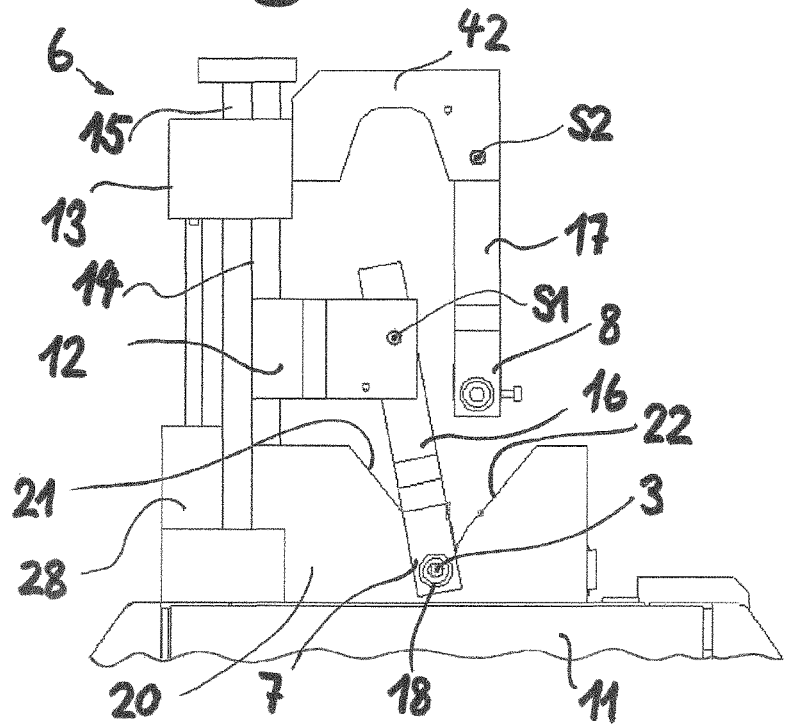
FIG. 5 is an enlarged view of the cable changer according to FIG. 3.

Except for the scale, FIG. 5 is identical to FIG. 3 and is used to explain further details. As can be seen clearly in FIG. 5, for example, the guide units 7, 8 are each pivotably mounted on the push elements 12, 13. The pivot axes are denoted by S1 and S2 respectively. The push elements 12, 13 are each displaceably mounted on vertical push guides 14, 15. The push guides 14, 15 are configured as guide tubes or guide rods, as can be seen in the following FIG. 7, for example. In order to move the respective push elements 12, 13 up and down, a pneumatic cylinder 28 is used in each case in the present embodiment. It is advantageous if two pneumatic cylinders are provided, one pneumatic cylinder in each case being associated with each guide unit 7, 8. The respective movements in order to produce the active position or the inoperative position of the two guide units 7 and 8 can be carried out by using a single pneumatic cylinder 28. However, instead of pneumatic means, other actuators are of course conceivable in order to produce the required lifting movement of the push elements 12, 13. As the second guide unit 8 interacts with a run-on flank 22 of the guideway 20 that is further removed from the push guide, in order to produce the active position, the assembly comprising the guide unit 8 comprises a horizontal lengthening part 42, which adjoins the push element 12.

The guideway 20 arranged opposite the guide units 7, 8 comprises two oblique, straight run-on flanks 21, 22. In principle, other forms, such as run-on flanks 21, 22, having a bent extension would be conceivable. The movement of the guide unit 7, 8 in order to produce the active position could be implemented in different ways depending on the intended use. The cable changer 6 shown in the embodiment is characterized in that the guide unit 7, 8 can be displaced initially in parallel with an axis specified by the push guide 14, 15, and can also be pivoted through the guideway 20 after contact or impact. This solution has the advantage that the movement of the guide unit 7, 8 takes place merely by means of the translationally acting actuator, which comprises the above-mentioned pneumatic cylinder 28 in the present case, and that no additional drive means is necessary in order to achieve the lowering-pivot movement.

Figure 6:
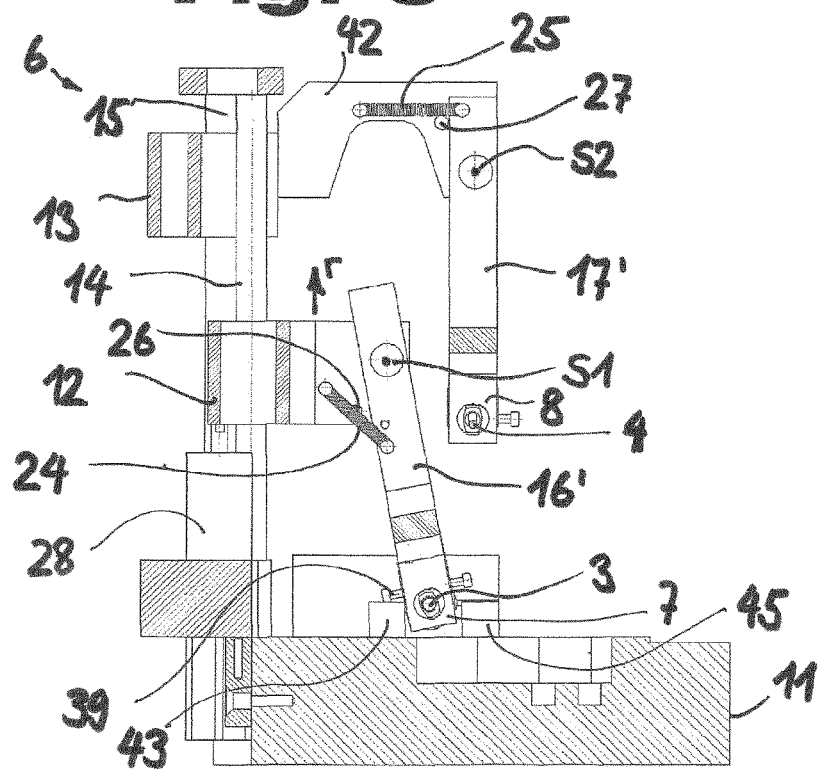
FIG. 6 shows the cable changer of FIG. 5 in a cross-sectional view.

In the active position shown in FIG. 5, the guide unit 7 is in a pivoted-out position. In this position, the associated lever part 16 is oblique relative to the vertical. The other lever part 17, which is associated with the guide unit 7, is clearly oriented vertically in the inoperative position. The lever parts are denoted by 16 and 17 in the front view according to FIG. 5; as the relevant lever assemblies comprising the lever elements are configured in two parts, the lever elements that can be seen in FIG. 6 are denoted by 16' and 17' (cf. for example the following FIG. 8, in which the respective front and rear lever elements 16, 16' and 17, 17' respectively can be seen particularly clearly). In order to return the guide unit 7 into the inoperative position, the push element 12 is displaced back upwards. The corresponding direction of displacement is indicated in FIG. 6 by the arrow r. The guide units 7, 8 are preloaded in the inoperative position by means of the return springs 24, 25 (FIG. 6). The return springs 24, 25 are configured as extension springs in the present case; however, if adapted appropriately, helical compression springs or other springs would also be conceivable. Due to the return springs 24, the original vertical orientation is resumed when the guide unit 7 is returned. The return springs for the second guide unit 8 are denoted by 25. In order to fix the relevant guide unit 7, 8 in place in the inoperative position, stopping elements 26, 27 are provided that each form a stop for the relevant guide unit 7, 8 or for the lever parts 16, 17 thereof and that are used to restrict the pivot movement when the relevant guide unit 7, 8 is returned from the active position into the inoperative position.

The cables 3, 4 are impacted and axially retained by retaining devices in order to secure the respective cables in the inoperative position. These retaining devices comprise engagement means, by means of which the retaining devices can be transferred into a state in which the retaining devices release the cables, such that the cables can be moved in the direction of the cable axis for cable transport. The engagement means mentioned are designed as screws 39 in the present case. Two stops 43, 45 can be seen in FIG. 6, which stops interact with the respective screws 39 when the active position is produced. The stop denoted by 43 is associated with the guide unit 7 and is used to release the associated retaining device. In the active position of the guide unit 7, the impact of the retaining device on the cable 3 is removed; the cable 3 can then be transported by means of the cable conveying device in order to process the cable end. The stop denoted by 45 is associated with the guide unit 8. The construction of this retaining device can be seen in the following FIG. 7. The mode of operation of the retaining device is described in more detail in the following.

Figure 7:
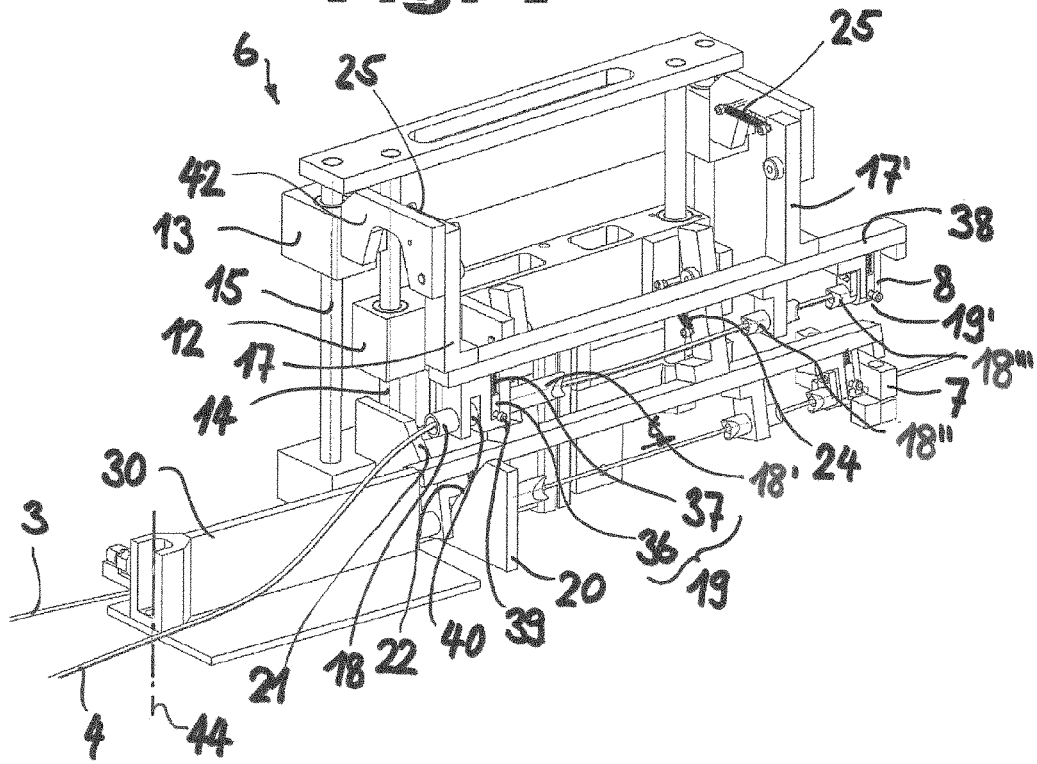
FIG. 7 is an enlarged perspective view of the cable changer for the cable processing device.

Further design details of the cable changer 6 are shown in FIG. 7. The two guide units 7, 8 comprise guide means and braking means for guiding and clamping the relevant cable 3, 4. These guide means and braking means are configured identically in the two guide units 7, 8. As the guide unit 8 can be seen more easily in the illustration according to FIG. 7, the construction thereof is explained in the following on the basis of the guide unit 8. However, the same embodiments also apply for the guide unit 7.

The guide unit 8 comprises a guide tube 18 arranged on the input side, which guide tube is arranged upstream of the belt drive relative to the machine longitudinal axis 10 in order to form the cable conveying device 5. The guide units 7, 8 comprise additional guide tubes that are denoted by 18' to 18'''. The guide tube 18' adjoins the guide tube 18 and may be connected thereto and therefore be formed of a component. The guide tubes 18'' and 18''' are formed by separate components. The guide tube 18'' is arranged between the belt drive 5 and a length measuring system 35 relative to the machine longitudinal axis 10 (cf. FIG. 8). The guide tube 18''' is arranged downstream of or behind the length measuring system 35 relative to the machine longitudinal axis 10 and therefore defines a guide means on the output side. The bore holes for guiding the cables through the guide pipes 18, 18', 18'', 18''' may be selected such that they match the outer diameter of the cables.

Furthermore, the guide unit 8 comprises two retaining devices 19 and 19', by means of which the cable 4 can be clamped. The retaining devices 19 and 19' comprise spring-loaded brakes. The braking means of the retaining devices 19 each comprise a clamping member 36 that clamps the cable by means of a helical compression spring 37 and thereby retains said cable. The screw 39 is furthermore arranged on the side of the clamping member 36, which screw forms an engagement means for the operative connection to the stop (not shown here) when the active position is produced.

The guide unit 8 is arranged on a support part 38. The lever assembly for the pivot movement is configured in two parts and comprises two lever parts 17 and 17'. The lever part 17 is arranged on the front or input-side end of the guide unit 8 and the lever part 17' is arranged on the output-side or rear end of the guide unit 8. In the two-part lever assembly, two return springs 25 are provided for preloading the guide unit 8 in the inoperative position.

An engagement member associated with the guide unit 8 is denoted by 40, which engagement member, when the push element 13 is lowered in order to produce the active position of the guide unit 8, strikes the guideway 20 and moves down the run-on flank 22. The engagement member 40 that is formed by the guide tube 18 has a cylindrical shape, which results in advantageous gliding. Of course, other engagement means could be provided. For example, the engagement member 40 could be formed by a roller. In this case, the guide unit 8 would move along the guideway 20 in a rolling manner.

The guideway 20 comprising the two run-on flanks 21 and 22 is formed by a planar component. A separating element 30 for separating and organizing the two cables 3 and 4 is arranged upstream of the cable changer 6. The separating element 30 formed by a T-shaped profile, comprising a separating web that runs vertically and a foot portion that adjoins the separating plate, prevents the cables 3 and 4 from crossing or touching each other. A simple vertical separating plate would also be conceivable as an alternative to the T-profile. The separating element 30 is pivotable about the vertical pivot axis denoted by 44 (FIG. 7). Depending on the operating position, the separating element 30 pivots towards the guide unit 7, 8 that is to be remain in the inoperative position.

Figure 8:
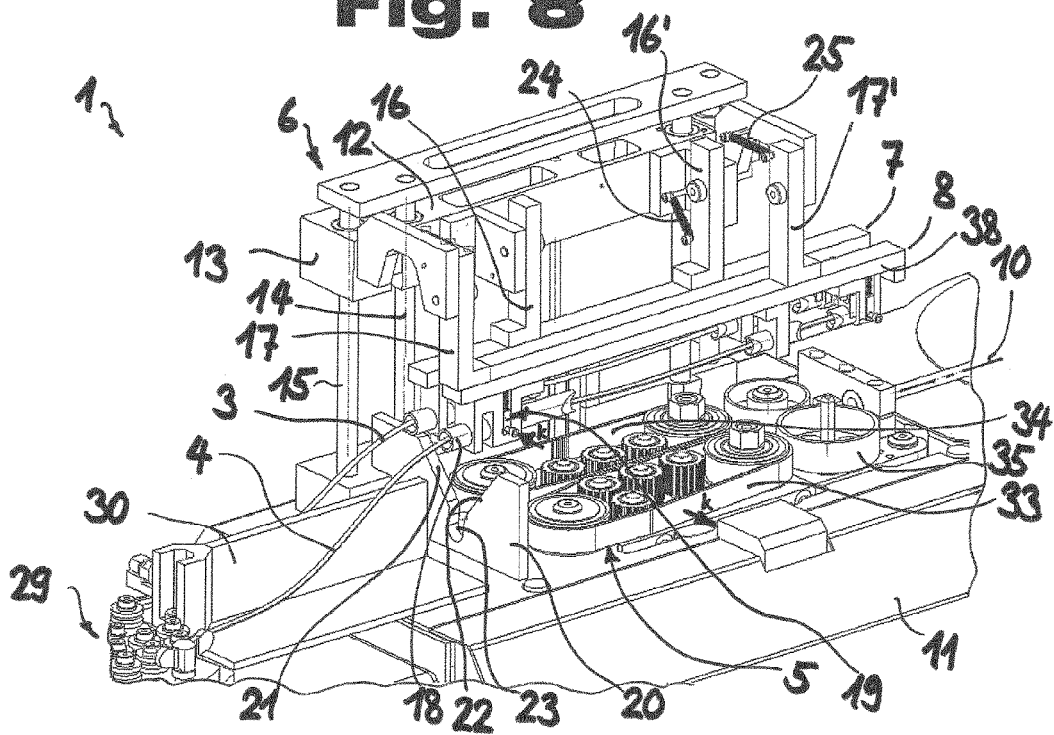
FIG. 8 is a further illustration of the cable processing device with the cable changer in the initial position.
Figure 9:
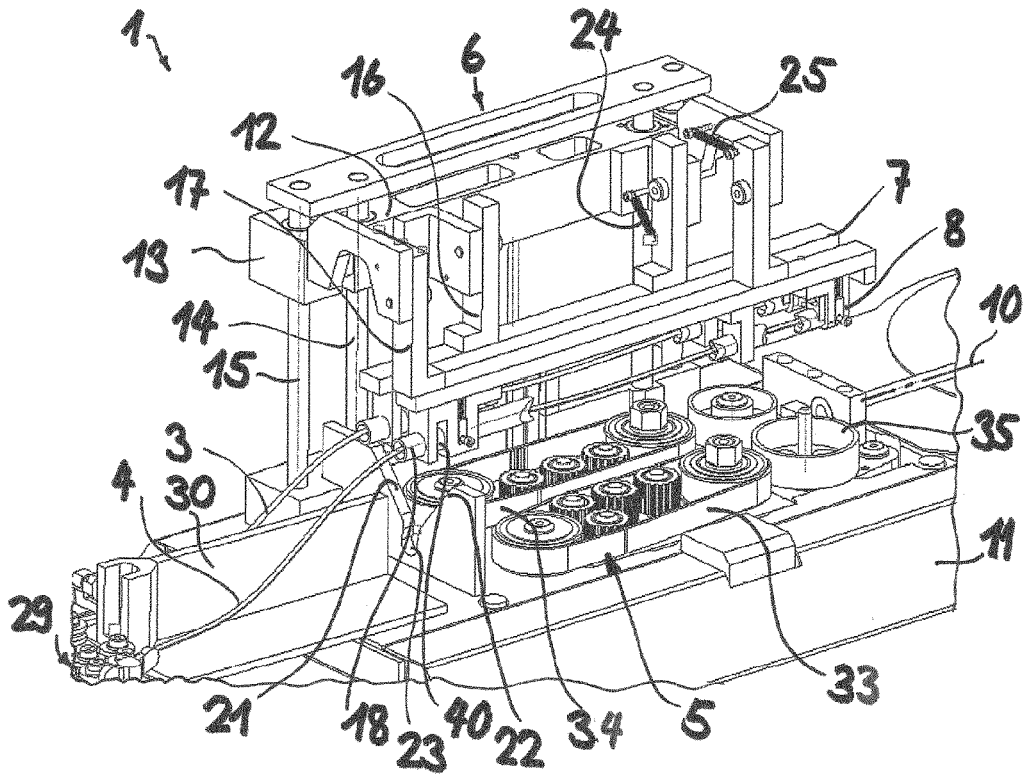
FIG. 9 shows the cable processing device with a cable conveying device in an open position.
Figure 10:
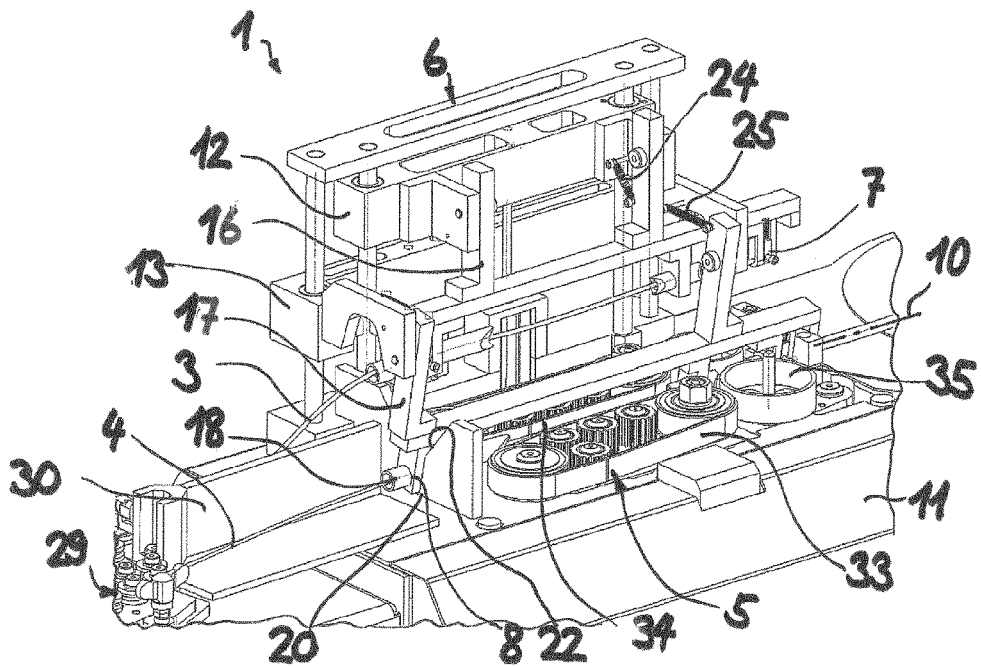
FIG. 10 shows the cable processing device after a guide unit of the cable changer has been lowered.
Figure 11:
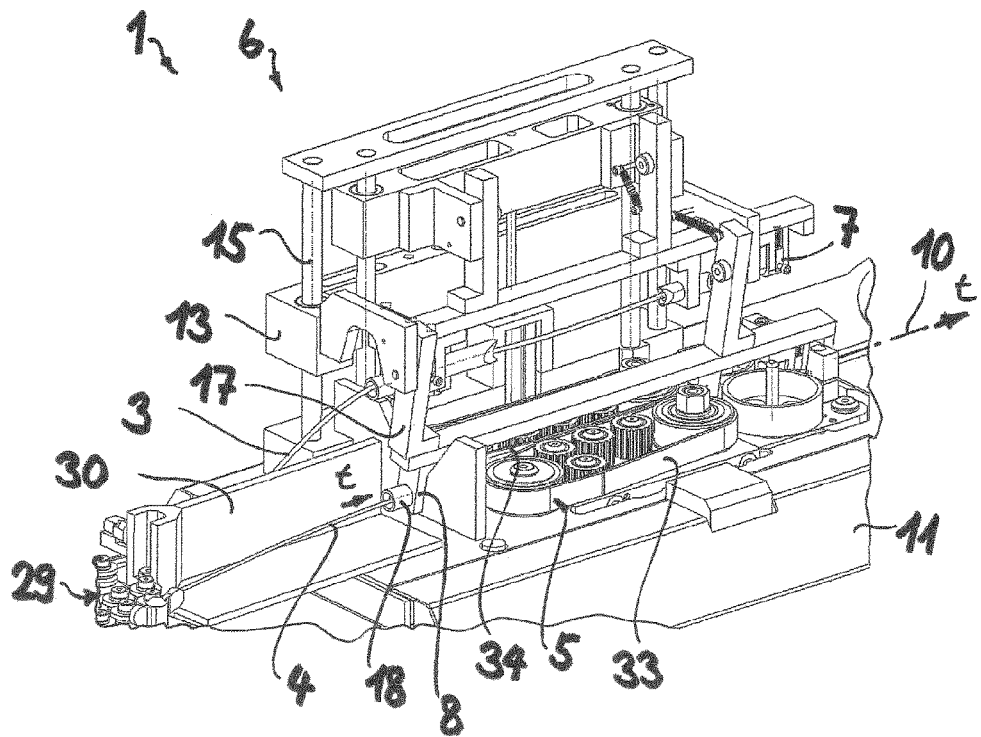
FIG. 11 shows the operation-ready cable processing device with the guide unit in the active position and with the cable conveying device being closed.

The function of the cable processing device 1 comprising the cable changer 6 can be further seen in FIGS. 8 to 11. In FIG. 8, the cable changer 6 is in its initial position in which the two guide units 7 and 8 are in their inoperative positions. The cable conveying device 5 configured as a belt drive is arranged underneath the cable changer. The belt drive of the cable conveying device 5 comprises two mutually opposing belts 33, 34. In order that a cable can be inserted into the cable conveying device 5, the belts 33, 34 must be moved away from each other. This opening movement of the cable conveying device 1 is indicated by the arrows k. In FIG. 9, the cable conveying device 5 is in the open position. One of the cables 3, 4 can then be inserted between the belts 33 and 34, as selected. If, for example, the cable 4 is to be supplied for processing, the corresponding guide unit 8 must be brought into the active position by lowering the push elements 13. FIG. 10 shows the cable changer 6 with the guide units 8 in the active position in the case of an open belt drive of the cable conveying device 5. The length measuring system 35 is otherwise movable, together with the belt drive, between an open position and a closed position. The other guide unit 7 remains in the inoperative position. The clamping member 36, which has clamped the cable 4 and retained said cable in the inoperative position by means of the helical compression spring 37, is displaced back by the action of a stationary stop 45 (not shown here; see FIG. 7, however) that is associated with the machine support. The screw 39 is used in this case as an engagement means that comes into contact with the mentioned stop 45. This stop could be formed by a separate component that is fastened to the machine support. It would also be conceivable to specify the stop by means of a corresponding design of the guideway 20. For example, the stop could be a projection that is arranged on or attached to the rear side of the guideway 20. The retaining devices 19 therefore interact with the guideway 20 in such a manner that when the active position is produced, the clamping effect on the cable 4 is removed and the cable 4 is released with regard to the cable axis. Owing to the guideway 20, the impact on the cable 4 can be automatically removed by moving the guide unit 8. Alternatively, it would also be conceivable to actuate the retaining devices 19 by means of a control unit (not shown), in order to move the clamping member 36 from the clamping position into the release position.

After the belts 33, 34 of the belt drive of the cable conveying device 5 have been moved towards each other and put into the closed position, in which the belts 33, 34 contact the cable 4, and the rollers of the length measuring system 35 are brought into the closed position, the cable can be transported in the t direction along the machine longitudinal axis 10 and then worked in the corresponding processing station. The belt drive can transport the cable 4 forwards to a cutter head (not shown) of a trimming and stripping station, where it is possible to begin working the cable 4. During the working process, the user has access to the guide unit 7 that has remained in the inoperative position and can clamp another cable there if required.

For the cable change from the cable 4 to the other cable 3, the cable conveying device 5 formed as a cable feed must transport the cable 4 backwards until said cable does not protrude beyond the guide unit 8 anymore. The pneumatic cylinder 28 then brings the guide unit 8 upwards into the inoperative position, whereupon the other guide unit 7, together with the cable, can be transferred into the active position.

The shown and above-mentioned embodiment of the cable processing device 1 comprising the advantageous cable changer 6 relates to merely one possible design variant. Of course, other embodiments are possible. For example, at least part of the mechanism of the cable changer 6 could be moved below the cable conveying device 5, thereby further improving accessibility for the operator. The pneumatic cylinder(s) for operating the guide units 7, 8 could be moved underneath the cable conveying device 5 and designed so as to act downwards. In addition, the push guides 14, 15 and the push elements 12, 13 could also be moved downwards, such that only the support parts 38, which support the guide means and braking means for the respective cables, would protrude beyond the cable conveying device 5. The swivel pins could also be moved downwards and the guideway could be replaced by control curves placed downwards. The brakes could be actuated actively, e.g. by means of Bowden cables.

FIGS. 12 to 17 show a second embodiment for a cable processing device 1 according to the invention for processing cables. Except for the modified cable changer 6, this cable processing device 1 has the same construction as the cable processing device 1 from FIG. 1 described above. This cable processing device 1 may also comprise a straightening station (not shown here) arranged upstream of the cable conveying device 5, which station straightens cables fed from drums, reels or bundles (not shown) to the cable processing device 1.

Figure 12:
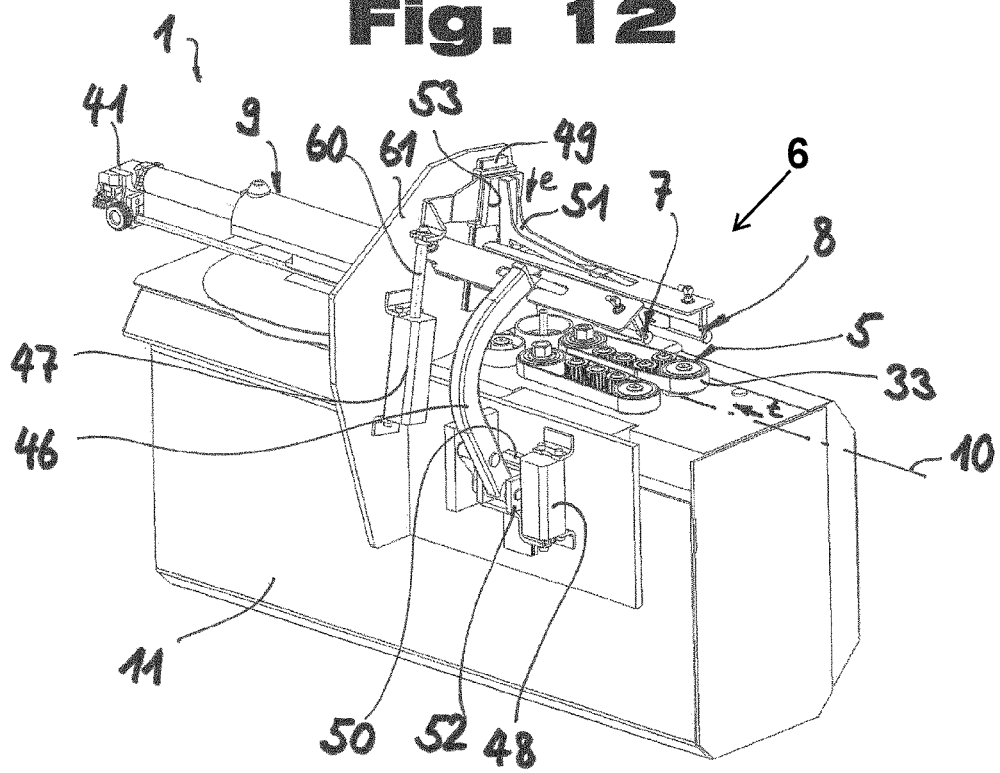
FIG. 12 is a perspective view of a further cable processing device according to the invention with a cable changer in an initial position.
Figure 13:
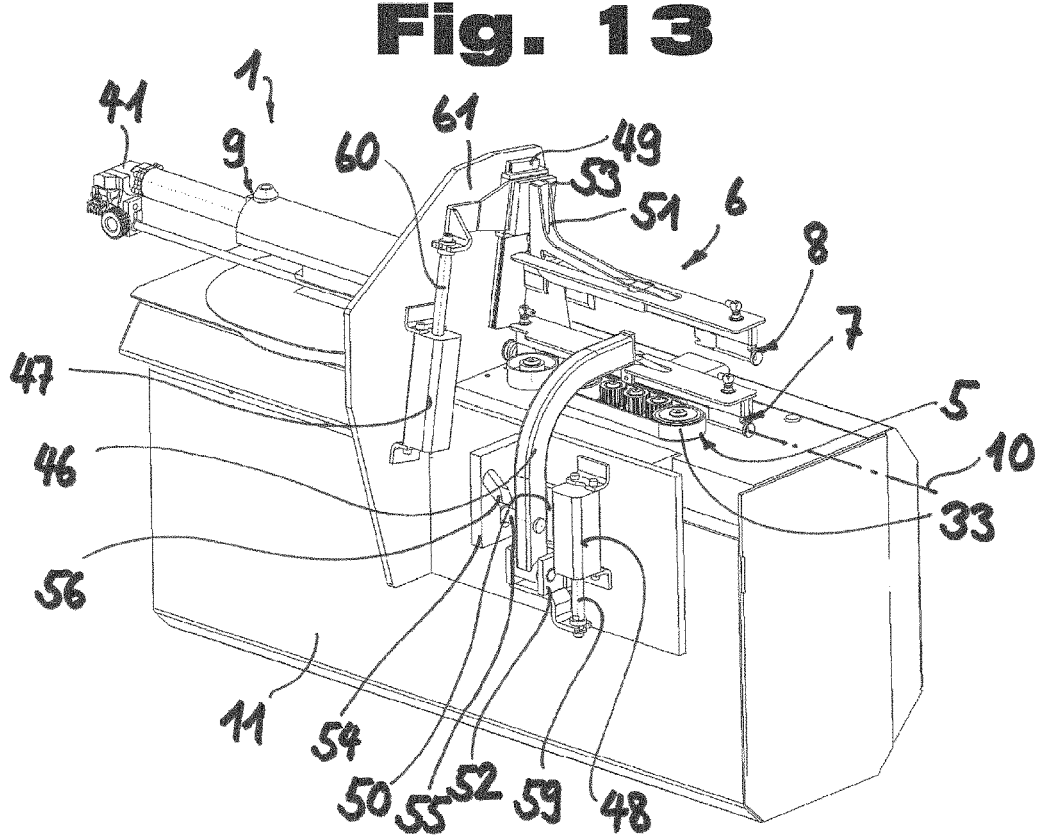
FIG. 13 shows the cable processing device from FIG. 12 with a cable changer in a first operating position.
Figure 14:
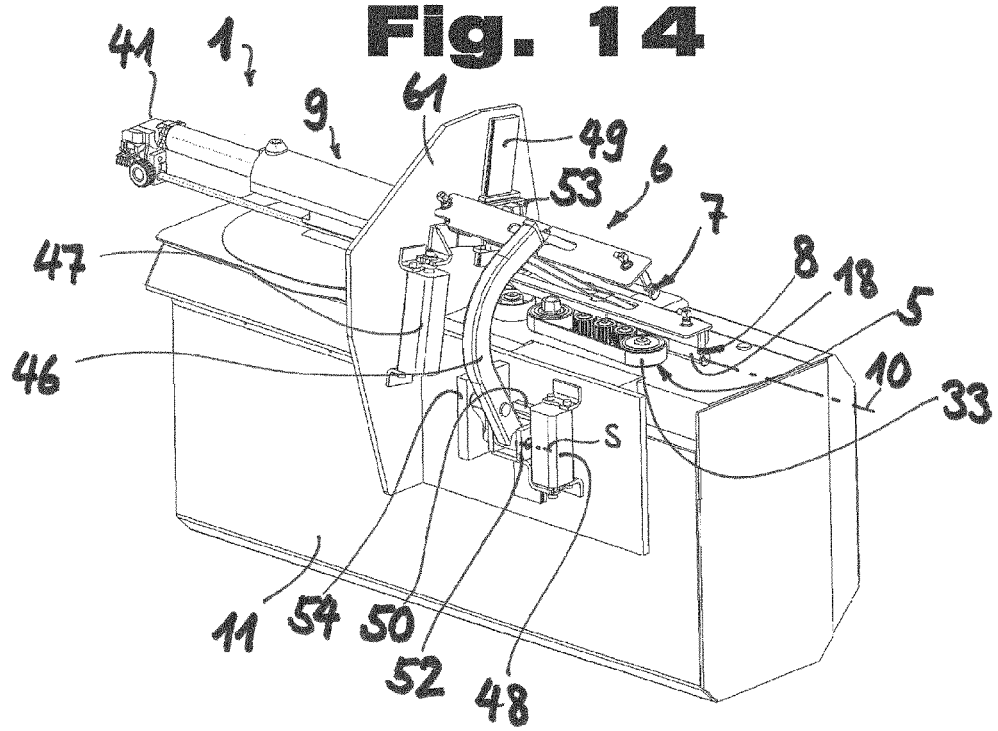
FIG. 14 shows the cable processing device with the cable changer in a second operating position.

FIG. 12 shows the cable changer 6 in the initial position, in which the two guide units 7, 8 are in their inoperative positions. The guide units 7, 8 are positioned lying next to each other in the initial position. The guide units 7, 8 are spaced apart from the cable longitudinal axis 10. Optionally, one of the guide units 7, 8 can then be brought into the active position in order to produce an operative connection to the cable conveying device 5. The two guide units 7, 8 are movable from the inoperative position into the active position independently of each other. The cable changer 6 is designed in such a manner that when one of the guide units 7, 8 is moved from the inoperative position into the active position, the other guide unit 7, 8 remains positionally fixed in the inoperative position. In FIG. 13, the guide unit denoted by 7 is in the active position; in FIG. 14, the guide unit denoted by 8 is in the active position.

The guide units 7, 8 are displaceably mounted relative to the machine support 11 so that the relevant guide unit 7, 8 can be moved between the active position and the inoperative position by means of linear guides 49, 50. The linear guide 49 for the guide unit 8 comprises a profile rail that is arranged in the cable processing device so as to be oblique relative to the vertical and on which a carriage 53 that encompasses the profile rail is displaceably mounted. The guide unit 8 is rigidly connected to the carriage 53 by means of a holding arm 51. As a result, the guide unit 8 associated with the linear guide 49 can be translationally moved obliquely between the inoperative position and the active position. The oblique translational lowering movement in order to produce the active position is indicated by an arrow e in FIG. 12. As can be seen in FIG. 13, the guide unit 8 lies on the machine longitudinal axis 10 in the active position and is therefore positioned coaxially to the machine longitudinal axis 10. In this case, the cable axis is the reference value for determining the position, along which cable axis the cable (not shown) can be transported in the axial direction by the guide unit 8. The coaxial arrangement of the guide unit 8 and the machine longitudinal axis can be seen, for example, in that the guide tube 18 of the guide unit 8 lies on the axis 10.

The other guide unit 7 is also moved by a linear guide 50. The linear guide 50 comprises a vertical profile rail in which a carriage having a bearing part 52 is displaceably mounted. A lever part 46 is pivotably mounted on the bearing part 52 (the corresponding pivot axis is denoted by S), to which lever part the end of the guide unit 7 opposite the bearing part 52 is fastened. A slotted link 54 is provided for defined movement of the guide unit 7 from the inoperative position into the active position. The slotted link 54 comprises a guide slot 56 in which a control body 55 can be moved along. The control body 55 comprises a roller that runs in a closed path in the guide slot 56. The roller of the control body 55 is attached to the lever part 46 so as to be freely rotatable. The lever part 46 is curved.

Pneumatic cylinders 47, 48 are used to move the guide units 7, 8. The respective pistons 59, 60 of the two pneumatic cylinders 47, 48 can be seen in FIG. 13, each of which pistons is extended. Instead of the pneumatic cylinders, other linearly acting actuators could also be used to move the guide units 7, 8 between the inoperative position and the active position. In addition to the pneumatic cylinders 47, 48 shown, hydraulic cylinders, electromechanical linear drivers, rack and pinion drives or spindle drives would also be conceivable.

The profile rail of the linear guide 49 and of the pneumatic cylinder 47 is fastened to a planar supporting construction 61 that is attached to the machine support. The plate of the supporting construction 61 runs on a vertical plane that is perpendicular to the longitudinal central axis 10. This plate also causes the working regions to be separated, as a result of which the operator is protected from accidents to persons. As shown in FIGS. 15 to 17, the carriage 53 has an arm 62 that extends perpendicular to the longitudinal central axis 10 and is attached to the end of the piston 60.

The cable changer 6 according to the second embodiment does not require a positioning trough for fixing the active position of the relevant guide unit 7, 8, as is the case in the first embodiment. Furthermore, springs are not necessary to enforce a return movement.

Figure 18:
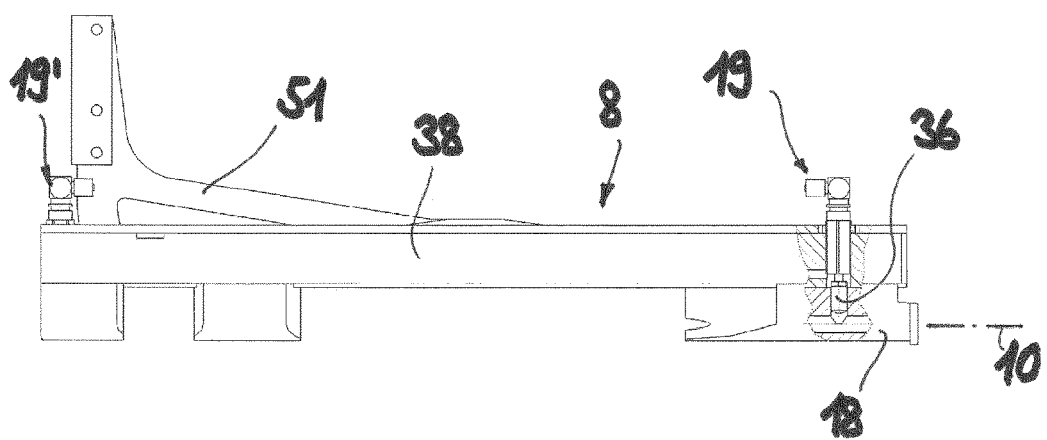
FIG. 18 is an enlarged view of a guide unit for the cable changer of the cable processing device according to FIG. 12.

FIG. 18 shows details of the retaining device 19, 19' for securing the cable in the inoperative position. The retaining device 19, 19' comprises two pneumatic cylinders for each guide unit 7 (the retaining device of the other guide unit 8 is similarly configured). The clamping cylinders each comprise clamping members 36 for clamping the cable. The two clamping cylinders of the retaining device 19, 19' can be opened together, which can be activated by means of switches or other switching means, for example. The retaining device 19, 19' can be opened in the active position in a program-controlled manner for efficient and secure operation.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A cable processing device including at least one processing station for processing cable ends of cables, a cable conveying device running along a machine longitudinal axis for transporting the cables to the at least one processing station in a direction of the machine longitudinal axis, and a cable changer arranged in a region of the cable conveying device for selectively suppling the cables to the at least one processing station, the cable changer comprising:

two guide units for guiding and holding one of the cables each;

each of the guide units being movable between an associated inoperative position and an active position, wherein the guide unit when positioned in the associated inoperative position is outside the cable conveying device and spaced apart from the machine longitudinal axis and the guide unit when positioned in the active position is coaxial with the machine longitudinal axis to produce an operative connection to the cable conveying device; and wherein the guide units are movable independently of each other between the associated inoperative position and the active position.

2. The cable processing device according to claim 1 wherein when one of the guide units is moved from the inoperative position into the active position, another of the guide units remain positionally fixed in the inoperative position.

3. The cable processing device according to claim 1 wherein when the guide units are in their respective inoperative positions, the guide units are positioned next to each other and on a common horizontal plane.

4. The cable processing device according to claim 1 wherein each of the guide units is connected to a respective push element, the push elements being translationally movable to move the respective guide unit between the active position and the associated inoperative position.

5. The cable processing device according to claim 4 including two push guides each for lowering and lifting a respective one of the guide units, the push elements being displaceably mounted on the respective push guides.

6. The cable processing device according to claim 4 wherein each of the guide units is rotatably mounted on the respective push element by a lever assembly having at least one lever part.

7. The cable processing device according to claim 4 including a guideway for guiding movement of the guide units from the associated inoperative positions into the active position.

8. The cable processing device according to claim 7 wherein the guideway is arranged opposite the guide units wherein when each of the push elements is lowered move the respective guide unit to the active position, the respective guide unit interacts with the guideway to move along the guideway.

9. The cable processing device according to claim 8 wherein the guideway includes a run-on flank for each of the guide units to move along.

10. The cable processing device according to claim 9 including a positioning trough into which each of the run-on flanks opens, the positioning trough fixing each of the guide units in the active position.

11. The cable processing device according to claim 9 where in the run-on flanks extend towards each other in a V shape.

12. The cable processing device according to claim 1 wherein each of the guide units includes a retaining device for securing one of the cables in the associated inoperative position, and wherein each of the retaining devices, in the active position of the respective guide unit, removes a clamping effect from the secured cable.

13. The cable processing device according to claim 1 wherein each of the guide units includes a spring element for returning the respective guide unit from the active position into the associated inoperative position.

14. The cable processing device according to claim 13 including a stopping element for each of the guide units, each of the stopping elements releasably fixing the respective guide unit in the associated inoperative position.

15. The cable processing device according to claim 1 including a separating element arranged upstream of the cable changer for separating and organizing the cables.

16. The cable processing device according to claim 1 wherein the guide units are each displaceably mounted relative to a machine support of the cable processing device by linear guides to move the guide units between the active position and the associated inoperative positions.

17. The cable processing device according to claim 16 wherein at least one of the linear guides is arranged in the cable processing device oblique to a vertical direction, and the guide unit associated with the at least one linear guide being translationally movable obliquely between the associated inoperative position and the active position.

18. The cable processing device according to claim 1 including a slotted link controlling movement of at least one of the guide units along a control curve from the associated inoperative position into the active position.

19. The cable processing device according to claim 18 wherein the slotted link includes a guide slot or a guide groove formed therein in which a control body is movable.

20. The cable processing device according to claim 19 wherein the control body is arranged on a lever part to support the at least one guide unit.

21. The cable processing device according to claim 20 wherein the lever part is curved.

22. The cable processing device according to claim 18 wherein the at least one guide unit follows a curve predetermined by the slotted link between the associated inoperative position and the active position, and another one of the guide units is translationally movable obliquely between the associated inoperative position and the active position.

23. The cable processing device according to claim 1 including linearly acting actuators for moving each of the guide units between the associated inoperative position and the active position, each of the actuators being one of a pneumatic cylinder, an hydraulic cylinder, an electromechanical linear drive, a rack and pinion drive, and a spindle drive.

* * * * *